(12) United States Patent
Jung et al.

(10) Patent No.: US 7,682,061 B2
(45) Date of Patent: Mar. 23, 2010

(54) DISPLAY DEVICE WITH REFLECTIVE SURFACE FOR REFLECTING LIGHT TO EDGES OF DISPLAY AREA

(75) Inventors: Kyu-Won Jung, Yongin-si (KR); Hun-Soo Kim, Yongin-si (KR); Ju-Eel Mun, Yongin-si (KR); Dong-Gun Moom, Yongin-si (KR); Gun-Shik Kim, Yongin-si (KR); Gyeong-Jae Heo, Yongin-si (KR); Jae-Kwang Ryu, Yongin-si (KR); Myun-gi Shim, Yongin-si (KR); Jae-Woo Bae, Yongin-si (KR); Do-Hyung Park, Yongin-si (KR); Sang-Yeol Hur, Yongin-si (KR); Hee-Seong Jeong, Yongin-si (KR); Kyu-Chan Park, Yongin-si (KR); Jun-Sik Oh, Yongin-si (KR); Jong-Hoon Shin, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 11/818,336

(22) Filed: Jun. 13, 2007

(65) Prior Publication Data

US 2008/0112186 A1    May 15, 2008

(30) Foreign Application Priority Data

Nov. 14, 2006    (KR) .................. 10-2006-0112214

(51) Int. Cl.
F21V 7/04 (2006.01)
(52) U.S. Cl. ...................................... 362/609; 362/633
(58) Field of Classification Search ................. 362/609, 362/612, 613, 632, 633, 614, 634
See application file for complete search history.

(56) References Cited

U.S. PATENT DOCUMENTS

| 7,223,003 | B2 * | 5/2007 | Kim .......................... 362/561 |
| 7,275,852 | B2 * | 10/2007 | Kim et al. .................... 362/612 |
| 7,293,906 | B2 * | 11/2007 | Mok et al. .................... 362/609 |
| 2007/0002590 | A1 * | 1/2007 | Jang et al. .................... 362/633 |

* cited by examiner

Primary Examiner—John A Ward
(74) Attorney, Agent, or Firm—Knobbe Martens Olson & Bear LLP

(57) ABSTRACT

A display device is provided. The display device includes a display panel comprising a display surface configured to display an image thereon, the display surface having an edge; a light source spaced apart from the display panel to form a space therebetween and configured to emit light to the display panel, wherein the display panel is configured to generate image on the display surface using the light from the light source; and a reflective surface arranged so as to reflect light emitted from the light source and to direct the reflected light to the edge.

18 Claims, 4 Drawing Sheets

DISPLAY DEVICE WITH REFLECTIVE SURFACE FOR REFLECTING LIGHT TO EDGES OF DISPLAY AREA

CROSS-REFERENCE TO RELATED APPLICATIONS

This application makes claims priority to and the benefit of Korean Patent Application No. 10-2006-0112214 filed on Nov. 14, 2006 in the Korean Intellectual Property Office, the disclosure of which is incorporated herein by reference in its entirety.

BACKGROUND

1. Field

The present invention relates to a display device.

2. Description of the Related Technology

The field emitter array (FEA) is known as an electron emission device. The FEA-type electron emission device typically includes an electron emission element, and cathode and gate electrodes to function as driving electrodes for controlling the electron emission of the electron emission device. The electron emission elements can be formed by a material having a relatively lower work function or a relatively large aspect ratio such as, for example, a carbon-based material including carbon nanotubes, graphite, and diamond-like carbon. The material is selected to effectively emit electrons when an electric field is formed around the electron emission elements under a vacuum atmosphere.

The electron emission elements are typically arrayed on a substrate to constitute an electron emission device. The electron emission device may be combined with another substrate, on which a light emission unit having phosphor layers and an anode electrode may be formed to constitute a light emission unit. A display device is manufactured by combining a display panel with the light emission unit.

SUMMARY OF THE INVENTION

According to one embodiment, a display device includes a display panel comprising a display surface configured to display an image thereon, the display surface having an edge; a light source spaced apart from the display panel to form a space therebetween and configured to emit light to the display panel, wherein the display panel is configured to generate image on the display surface using the light from the light source; and a reflective surface arranged so as to reflect light emitted from the light source and to direct the reflected light to the edge.

According to another embodiment, a display device includes a surface light source configured to emit visible light; an array of pixels forming a display surface and arranged to receive visible light from the surface light source, wherein each pixel is configured to selectively pass visible light incident thereto such that the array as a whole can display an image on the display surface; a frame framing the display surface so as to define a viewing area of the display surface, wherein the frame comprises an edge defining an edge of the viewing area; and a mirror reflective with respect to visible light and extending generally parallel to the edge of the viewing area.

DETAILED DESCRIPTION OF THE PREFERRED EMBODIMENT

Figure 1:
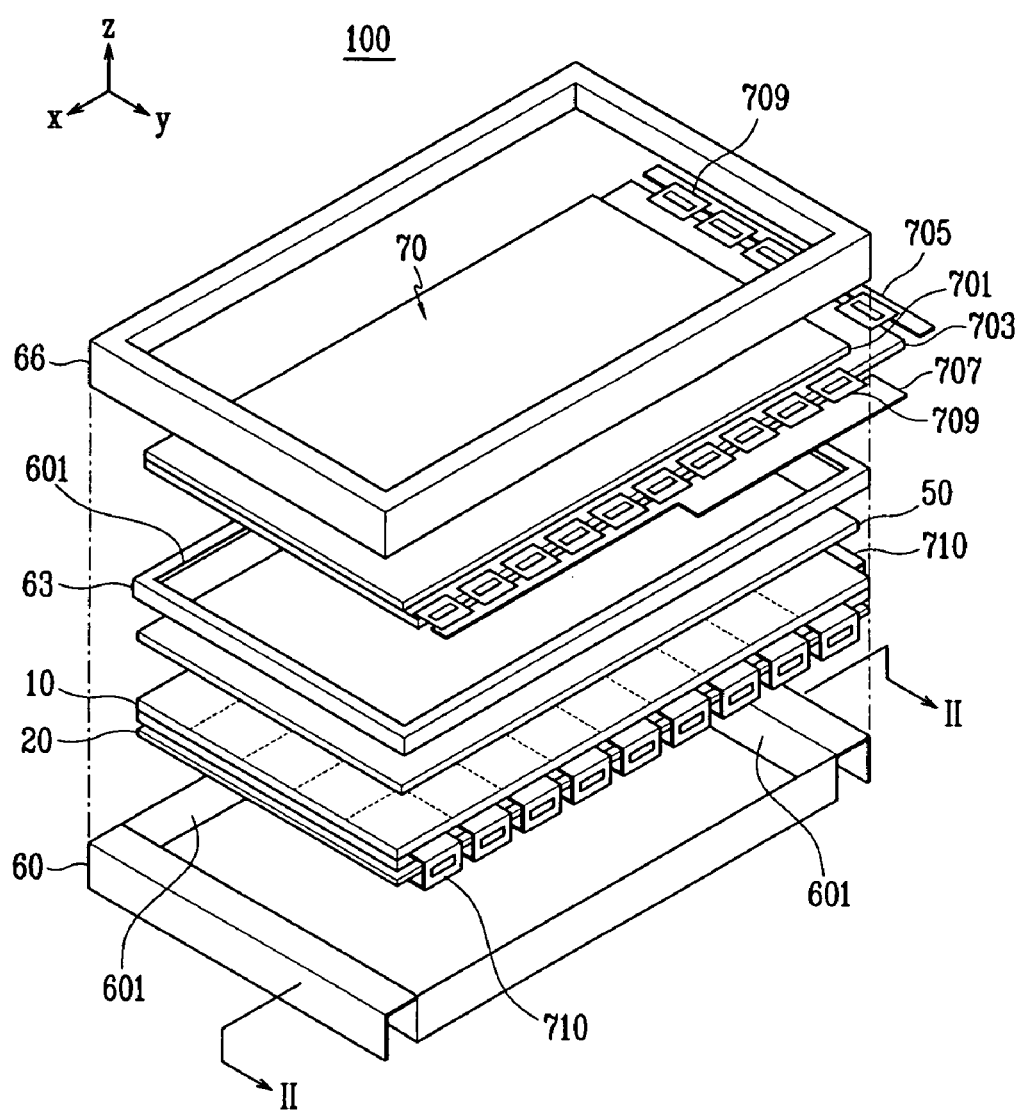
FIG. 1 is an exploded perspective view of a display device according to an embodiment.

With reference to the accompanying drawings, embodiments will be described in order to enable those skilled in the art to be able to implement them. As those skilled in the art would realize, the described embodiments may be modified in various ways, all without departing from the spirit or scope of the present invention. Wherever possible, the same reference numbers will be used throughout the drawings to refer to the same or like parts.

It will be understood that when an element is referred to as being "on" another element, it can be directly on the other element or intervening elements may be present between them. In contrast, when an element is referred to as being "directly on" another element, there are no intervening elements present.

It will be understood that although the terms "first," "second," "third," etc., may be used herein to describe various elements, components, elements, layers, and/or sections, these elements, components, elements, layers, and/or sections should not be limited by these terms. These terms are only used to distinguish one element, component, element, layer, or section from another element, component, element, layer, or section. Thus, a "first" element, component, element, layer, or section discussed below could be termed a "second" element, component, element, layer, or section without departing from the teachings of the invention.

The terminology used herein is for the purpose of describing particular embodiments only and is not intended to limit the invention. As used herein, the singular forms "a," "an," and "the" are intended to include the plural forms as well, unless the context clearly indicates otherwise. It will be further understood that the terms "comprises" and/or "comprising," or "includes" and/or "including", when used in this specification, are intended to specify the presence of stated features, elements, integers, steps, operations, elements, and/or components, but do not preclude the presence or addition of one or more other features, elements, integers, steps, operations, elements, components, and/or groups thereof.

Spatially relative terms, such as "beneath," "below," "lower." "above," "upper," "over," and the like may be used herein for ease of description to describe the relationship of one element or feature to another element(s) or feature(s) as illustrated in the figures. It will be understood that these spatially relative terms are intended to encompass different orientations of the device in use or operation in addition to the orientation depicted in the figures. For example, if a device shown in the figures is turned over, elements described as "below" or "beneath" other elements or features would then be considered oriented "above" the other elements or features. Thus, the term "below" can encompass an orientation of both above and below. The device may be otherwise oriented (e.g., rotated 90 degrees or at other orientations) and the spatially relative descriptors used herein are interpreted accordingly.

Unless otherwise defined, all terms (including technical and scientific terms) used herein can have the same meaning as commonly understood by one with ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to perspective views that are schematic illustrations of idealized embodiments of the present invention. As such, variations from the shapes of the illustrations caused by, for example, various manufacturing techniques and/or tolerances, are to be expected. Thus, embodiments should not be construed as limited to the particular shapes of elements illustrated herein but are to include deviations in shapes that result, for example, from manufacturing. As an example, an element illustrated or described as flat may have rough and/or nonlinear features. Moreover, angles that are illustrated as sharp may be rounded. Thus, the elements illustrated in the figures are schematic in nature and their shapes are not intended to illustrate the precise shape of an element and are not intended to limit the scope of the present invention.

FIG. 1 illustrates an exploded view of a display device 100 according to an embodiment.

The display device 100 includes a display panel 70 and a light source unit 10. The display device 100 may further include fixing members 60, 63, and 66 for fixing and supporting the display panel 70 and the light source unit 10. A diffuser plate 50 may be located between the display panel 70 and the light source unit 10 for diffusing the light emitted from the light source unit 10, and supplying it to the display panel 70. The diffuser plate 50 may be removed.

A liquid crystal display panel may be used as the display panel 70. The display panel 70 may include upper and lower substrates 701 and 703. The upper and lower substrates 701 and 703 may be made of a glass material. Polarizers (not shown) may be attached on respective outer surfaces of the upper and lower substrates 701 and 703 to polarize the light. Liquid crystal may be injected between the upper and lower plates 701 and 703. A color filter, a gate line, a data line, a thin film transistor (TFT) and the like may be formed at each display pixel between the upper and lower substrates 701 and 703. The TFT may be turned on or off according to a driving signal that can be transmitted through the gate and data lines to vary an orientation angle of the liquid crystal, thereby displaying an image on the display panel 70.

In order to apply the driving signal to the gate and data lines of the display panel 70, gate and data printed circuit boards 705 and 707 may be connected to the display panel 70 through driver integrated circuit packages (driver IC packages) 709. A tape carrier package (TCP) or a chip on film (COF) may be used as the driver IC package 709. The gate printed circuit board 705 can generate a gate driving signal and transmit the same to the gate line. The data printed circuit board 707 can generate a data driving signal and transmit the same to the data line. In order to minimize a non-display region of the display device 100, the gate and data printed circuit boards 705 and 707 may be received in a side of the display device 100.

The light source unit 10 can supply light to the display panel 70. As illustrated by the dotted lines in the light source unit of FIG. 1, the light source unit 10 may be driven by each light emission pixel, i.e., dimming drive. One light emission pixel of the light source unit 10 may correspond to two or more display pixels of the display panel 70. Therefore, the light emission pixel can emit light having a brightness that is appropriate for the display pixel to the display pixel. As a result, the dynamic contrast ratio of an image displayed on the display panel 70 can be improved.

An electron emission type light source unit may be used as the light source unit 10. The electron emission type light source unit may be provided with a plurality of gate lines and a plurality of data lines. The gate and data lines may be connected to a printed circuit board 20 through the driver IC package 709. The printed circuit board 20 can apply driving signals to the gate and data lines, thereby operating the light source unit 10.

In the illustrated embodiment, the fixing members 60, 63, and 66 are first, second, and third fixing members, respectively. The first, second and third fixing members 60, 63 and 66 may be made of resin or metal. The first fixing member 60 may receive the diffuser plate 50, the light source unit 10, and the printed circuit board 20. The second fixing member 63 may fix the diffuser plate 50 by covering the same. The display panel 70 may fixedly seat on the second fixing member 63. The third fixing member 66 may cover the edges of the display panel 70 to fix the display panel 70 on the second fixing member 63. In addition, the gate and data printed circuit boards 705 and 707 may be folded and fixed on an inner side of the third fixing member 66.

According to an embodiment, the inner sides of the second and third fixing members 63 and 66 include light reflective layers 601. By supplying the light emitted from the light source unit 10 to the display panel 70 using the light reflective layers 601, light loss can be minimized and light utilizing efficiency can be maximized. The light reflective layers 601 will now be described in more detail with reference to FIG. 2 hereinafter.

Figure 2:
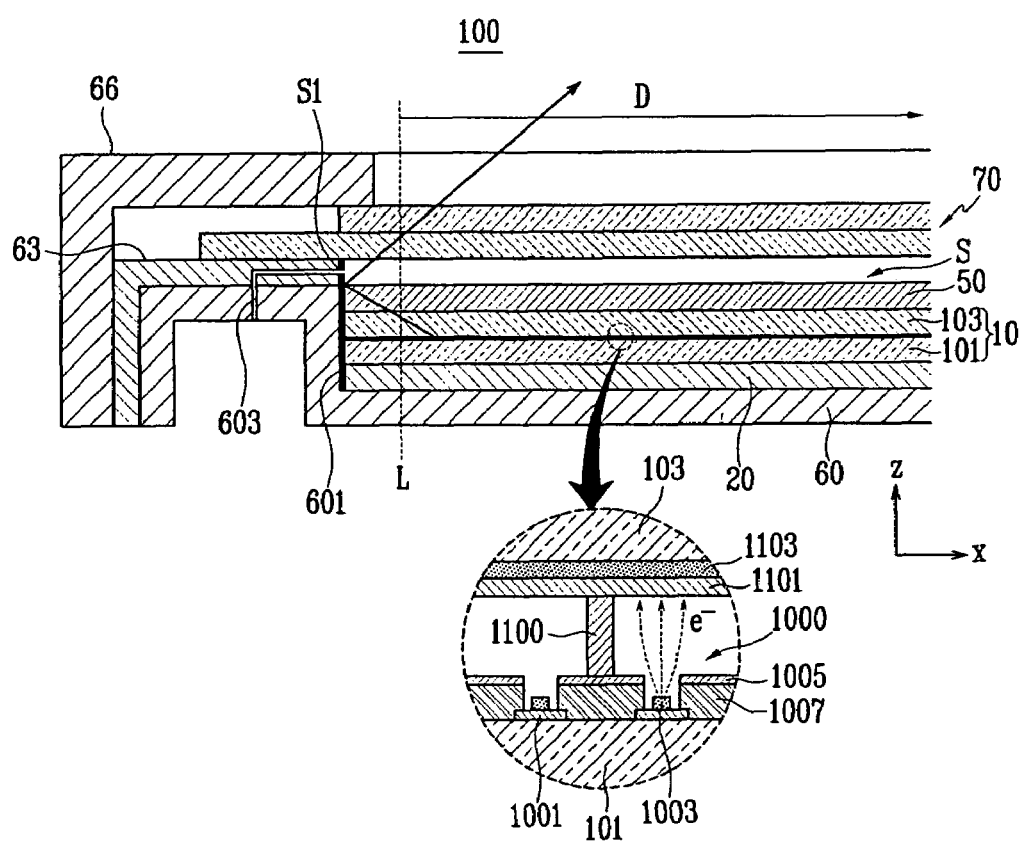
FIG. 2 is a cross-sectional view taken along line II-II of FIG. 1.

FIG. 2 is a schematic cross-sectional view taken along a line II-II of FIG. 1 after the display device 100 of FIG. 1 is assembled. In the circle inset of FIG. 2, an internal structure of the light source unit is illustrated as an enlarged view. A right region D with reference to a boundary line L corresponds with a display region, where the display panel 70 displays the image, and a light emission region, where the light source unit 10 emits the light.

As illustrated in FIG. 2, the light source unit 10 may be spaced apart from the display panel 70 to define a space S. The space S can include the entire region where the diffuser plate 50 is positioned. By forming the space S, the light emitted from the light source unit 10 can be suitably diffused and then can be supplied to the display panel 70, and thus the uniformity of the brightness of the light can be improved. Since the space S can be defined by a space surrounded by the first and second fixing members 60 and 63, the inner sides of the first and second fixing members 60 and 63 can be adjacent to the space S. According to other embodiments, the space S may be defined by other methods rather than by the fixing members.

The space S may include a side S1. Since the side S1 includes the light reflective layer 601, as indicated by the arrow of FIG. 2 representing the light reflected, the side S1 can reflect the light emitted from the light source unit 10 and direct the light toward the display panel 70. Meanwhile, the inner sides of the first and second fixing members 60 and 63 can also respectively include reflective layers 601. Therefore, the light loss can be minimized in the space S. Since the light loss can be minimized, there is no need to make the light emission region of the light source unit 10 large. As a result, as illustrated in the region D of FIG. 2, an area of the display region of the display panel 70 can be substantially identical to that of the light emission region of the light source unit 10.

In the case of a dimming drive type of light source unit, the light emitted from the light emission pixels located at a periphery region is partly lost due to its unique location.

Especially in case of the dimming drive type of light source unit, since the light emission pixels are typically driven independently according to the dimming drive, it is difficult to compensate for the deterioration of the brightness from the adjacent light emission pixels. Therefore, the display quality of the image displayed at the periphery of the display panel is deteriorated since the brightness at the periphery is reduced. To prevent this, the light emission region of the light source unit is typically designed to be larger than that of the display region of the display panel in order to prevent the deterioration of the brightness at the periphery.

However, in the present case, since the size of the light source unit can increase, the manufacturing cost can also increase and the receiving structure of the light source unit can become complicated during the manufacturing process. In addition, since there is typically a size difference between the display region of the display panel and the light emission region of the light emission unit, it is difficult to make the display pixels properly correspond to the light emission pixels of the light emission unit.

According to an embodiment of the present invention, the use of light reflective layers 601 can prevent the reduction of the brightness at the periphery of the light source unit 10. Therefore, as described above, the display region and the light emission region can be designed to have areas that are substantially identical to each other. As a result, since the light source unit 10 can be designed to be compact, the manufacturing cost can be reduced and accordingly, the light source unit 10 can be more conveniently received in the first fixing member 60.

The light reflective layer 601 may be formed by any material as long as it can reflect the light. For example, the light reflective layers 601 may be formed of aluminum. In order to maximize light reflectivity, the reflectivity of the light reflective layer 601, i.e., a ratio of the amount of reflected light to the amount of light incident on the light reflective layer 601, may be 80% or more.

In addition, openings 603 can be formed in the first and second fixing members 60 and 63. Therefore, the space S may communicate with an external side through the openings 63. Since the space S is sealed, it may be heated to a high temperature by the thermal energy of the light emitted from the light source unit 10. Therefore, the diffuser plate 50 may become deformed by the high temperature. Accordingly, the thermal deformation of the components can be prevented by circulating the air into the space S through the openings 603.

As illustrated in the enlarged circle inset of FIG. 2, the light source unit 10 may be the electron emission unit. Since the light source unit 10 in the illustrated embodiment has a plurality of electron emission elements for the respective light emission pixels, the dimming drive is possible. The internal structure and the operational principle of the light source unit 10 will now be described in detail.

The light source unit 10 may include an electron emission device 1000, an anode electrode 1101, a phosphor layer 1103, a spacer 1100, etc. The spacer 1100 may be located between first and second substrates 101 and 103 facing each other to support them.

The electron emission device 1000 may include cathode electrodes 1001, electron emission elements 1003, and gate electrodes 1005. An insulation layer 1007 may be interposed between the cathode and gate electrodes 1001 and 1005 to prevent a short circuit from occurring between the cathode and gate electrodes.

The cathode electrodes 1001 can be arranged on the first substrate 101 in a stripe pattern. The cathode electrodes 1001 can then be applied with a data driving voltage to function as data electrodes. The gate electrodes 1005 can be arranged in a stripe pattern extending in a direction (i.e., the x-axis) that crosses the cathode electrodes 1001. The cathode and gate electrodes 1001 and 1005 may be made of a conductive material including an indium thin oxide (ITO) or another metal.

The electron emission elements 1003 may be located at each crossed region of the cathode and gate electrodes 1001 and 1005. The electron emission elements 1003 may be electrically connected to one of the cathode and gate electrodes 1001 and 1005. For instance, the enlarged circle inset of FIG. 2 shows an example of how the electron emission elements 1003 can be connected to the cathode electrodes 1001.

Openings may be formed in the insulation layer 1007 and the gate electrodes 1005 to allow the electrons emitted from the electron emission elements 1003 to pass through. By a voltage difference between voltages applied to the cathode and gate electrodes 1001 and 1005, electrons $e^-$ can then be emitted from the electron emission elements 1003.

The electron emission elements 1003 may be made of a material that emits electrons when an electric field is induced under a vacuum atmosphere, such as a carbon-based material or a nanometer-sized material. For example, the electron emission elements 1003 may include but are not limited to carbon nanotubes, graphite, graphite nanofibers, diamonds, diamond-like carbon, $C_{60}$, silicon nanowires, or a combination thereof. The electron emission device 1003 may be formed by various processes including but not limited to a screen-printing, chemical vapor deposition, sputtering, and the like. Alternatively, the electron emission elements 1003 may be formed in a Mo-base or Si-based pointed-tip structure.

The phosphor layer 1103 and anode electrode 1101 may be provided on the second substrate 103. Since a high voltage can be applied to the anode electrode 1101, the electrons emitted from the electron emission elements 1003 can collide with the phosphor layer 1103 at a high speed. Therefore, light may be emitted from the phosphor layer 1103 to the external side through the second substrate 103.

Since the phosphor layer 1103 may be a white phosphor layer, white light can be emitted to the external side. Alternatively, the phosphor layer 1103 may be formed by red, green and blue phosphor layers emitting light of a variety of colors.

As illustrated in the enlarged circle inset of FIG. 2, the phosphor layer and the anode electrode may be in an order such that the phosphor layer 1103 is formed over the second substrate 103 and the anode electrode 1101 is formed over the phosphor layer 1103. Since the phosphor layer 1103 is adjacent to the second substrate 103 in the embodiment shown, the anode electrode 1101 would not interfere with the light emitted from the phosphor layer 1103. Therefore, the anode electrode 1101 may be formed of non-transparent metal having a superior electric conductivity in the illustrated embodiment.

Alternatively, the anode electrode and the phosphor layer may be formed in an order such that the anode electrode 1101 is formed over the second substrate 103 and the phosphor layer 1103 is formed over the anode electrode 1101. In this case, since the light is emitted from the phosphor layer to the external side through the anode electrode and second substrate 103, the anode electrode may be formed of a transparent material such as the ITO.

The operation of the light source unit 10 will now be described with reference to the enlarged circle inset of FIG. 2. Predetermined driving voltages may be applied to the cathode and gate electrodes 1001 and 1005. In this case, an electric field can be formed around the electron emission elements 1003 at a pixel where a voltage difference between the cathode and gate electrodes 1001 and 1005 is equal to or greater than a threshold value. As a result, electrons e⁻ can be emitted from the electron emission elements 1003. The emitted electrons can collide with the phosphor layer 1003 of the corresponding pixel by being attracted by the high voltage applied to the anode electrode 1101. Thus, the phosphor layer 1003 can be excited to emit the light to an external side through the second substrate 103.

Figure 3:
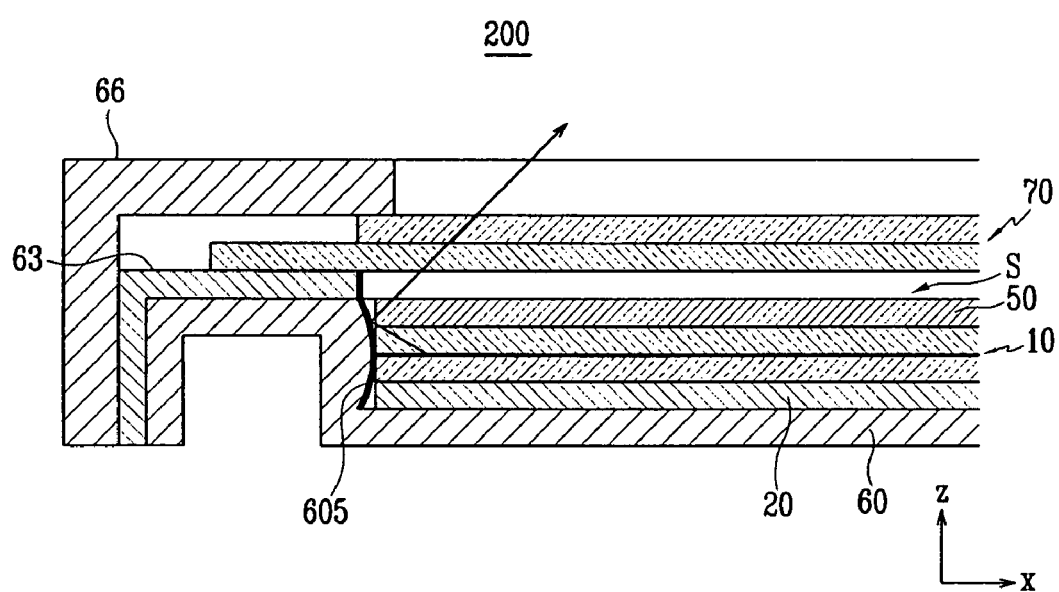
FIG. 3 is a sectional view of a display device according to another embodiment.

FIG. 3 illustrates a schematic of a display device 200 according to another embodiment. Since the display device 200 illustrated in FIG. 3 is similar to the display device 100 of FIG. 2, like reference numerals refer to like elements and the different features of the illustrated embodiment will be described.

As illustrated in FIG. 3, an inner side of a first fixing member 60 that includes a light reflective layer 605 may be bulged toward the interior of a space S, or have a convex surface. In this case, the light emitted from the light source unit 10, as indicated by the arrow in FIG. 3, can be more effectively reflected and directed toward the display panel 70. In other words, a convex surface can reflect the light with a larger angle of incidence between the light emitted and the light reflected toward display panel 70. As a result, the space between the active display and light emission regions from the first fixing member 60 can be minimized. In addition, a diffuser plate 50 or a printed circuit board 20 may be more easily fixed on the first fixing member 60.

Figure 4:
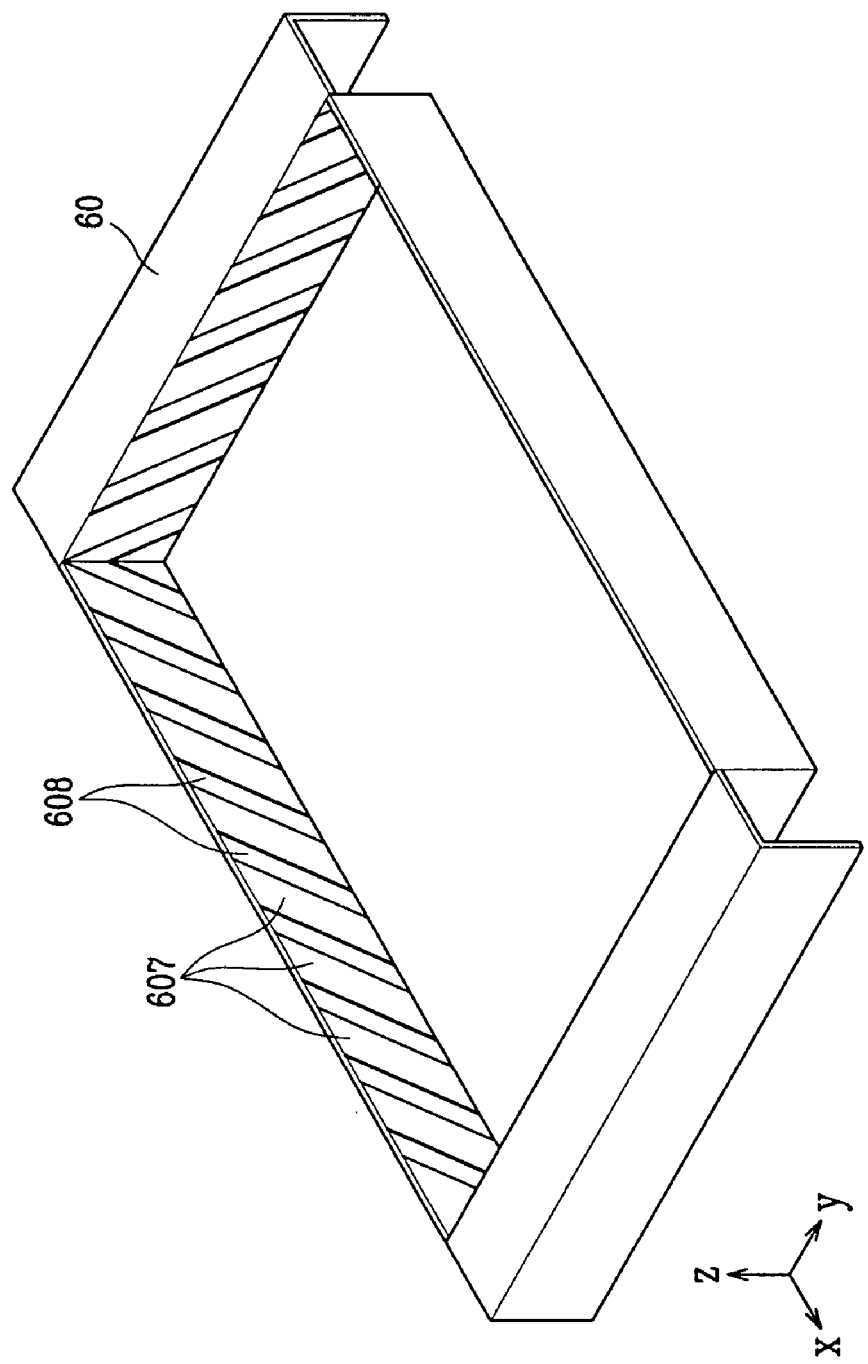
FIG. 4 is a perspective view of a fixing member of a display device according to another embodiment.

FIG. 4 illustrates a first fixing member 60 in a display device according to another embodiment. Since the first fixing member 60 of FIG. 4 is similar to those of FIGS. 1 to 3, the different features of the illustrated embodiment will be described.

As illustrated in FIG. 4, a plurality of light reflective sections 607 may be formed on the inner side of the first fixing member 60. The plurality of light reflective sections 607 are shown to be spaced apart from each other in a parallel manner, with non reflective sections 608 interposed between adjacent reflection sections 607. In addition, the plurality of light reflective sections 607 may be arranged in a comb pattern as illustrated in FIG. 4, to minimize the loss of the light emitted from the light source unit. Therefore, the brightness of light supplied to the display panel, particularly, the brightness of the light at the periphery of the display panel, can be enhanced. Furthermore, the plurality of light reflective layers 607 can be spaced apart from each other to provide an air flow passage between the light reflective layers 607.

As described above, since the loss of light at the periphery of the display panel can be minimized by using a light reflective layer, the uniformity of the light can be improved and the overall light brightness can also be enhanced.

Although exemplary embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A display device comprising:
    a display panel comprising a display surface configured to display an image thereon, the display surface having an edge;
    a light source spaced apart from the display panel to form a space therebetween and configured to emit light to the display panel, wherein the display panel is configured to generate an image on the display surface using the light from the light source;
    at least one fixing member configured to support and fix the display panel and the light source;
    a reflective surface arranged next to the light source and the space so as to reflect light emitted from the light source and to direct the reflected light toward the display panel, wherein the reflective surface comprises a curved portion; and
    an air passageway formed through the at least one fixing member to the space, wherein the air passageway is connected to the space through an opening formed on the reflective surface.

2. The device of claim 1, wherein the space is in fluid communication with an exterior of the display device through the air passageway.

3. The device of claim 1, wherein the light source has a light emitting surface, and wherein the display surface and the light emitting surface have substantially the same size.

4. The device of claim 1, wherein the reflective surface is part of the at least one fixing member.

5. The device of claim 4, wherein an inner surface of the at least one fixing member comprises at least one light reflective section.

6. The device of claim 5, wherein the inner surface comprises a plurality of light reflective sections, wherein the plurality of light reflective sections are spaced apart from each other, and wherein two or more of the plurality of light reflective sections comprise edges extending generally parallel to each other and at an angle with respect to the display surface.

7. The device of claim 6, wherein the inner surface further comprises a non-reflective section interposed between two neighboring light reflective sections.

8. The device of claim 6, wherein the at least one light reflective section comprises aluminum.

9. The device of claim 6, wherein the at least one light reflective section has a reflectivity of 80% or more with respect to visible light.

10. The device of claim 6, wherein the reflective surface is substantially perpendicular to the display surface.

11. The device of claim 6, wherein the inner surface comprises a convex surface bulged toward the space.

12. The device of claim 1, wherein the light source comprises a field emission device.

13. The device of claim 1, wherein the display panel is a liquid crystal display panel.

14. The display device of claim 1, wherein the reflective surface is arranged along the edge of the display surface.

15. The display device of claim 1, wherein the reflective surface is arranged along an edge of the light source.

16. The display device of claim 1, wherein the reflective surface surrounds the light source.

17. The display device of claim 1, wherein the reflective surface comprises a planar portion.

18. The display device of claim 1, wherein the light source has a light emitting surface facing the display panel, and the reflective surface comprises a portion substantially perpendicular to the light emitting surface.

* * * * *